United States Patent [19]
Perilhou et al.

[11] 3,995,281
[45] Nov. 30, 1976

[54] RECORDING HEAD FOR A RECORDING DEVICE UTILIZING ELECTROSENSITIVE RECORDING PAPER

[75] Inventors: Jean-Robert Perilhou, Bourg-la-Reine; Guy Noël Martin, Puteaux, both of France

[73] Assignee: U.S. Philips Corporation, New York, N.Y.

[22] Filed: Apr. 21, 1975

[21] Appl. No.: 569,977

[30] Foreign Application Priority Data
May 8, 1974 France .............................. 74.15880

[52] U.S. Cl. ........................... 346/139 C; 346/76 R; 219/216
[51] Int. Cl.² ..................... G01D 15/10; H05B 1/00
[58] Field of Search ...................... 346/139 C, 76 R; 219/216

[56] References Cited
UNITED STATES PATENTS

| | | | |
|---|---|---|---|
| 2,916,343 | 12/1959 | Alden | 346/139 C |
| 3,267,485 | 8/1966 | Howell et al. | 346/139 C |
| 3,470,563 | 9/1969 | Starr, Jr. | 346/139 C |
| 3,777,116 | 12/1973 | Brescia et al. | 346/76 R UX |

*Primary Examiner*—George H. Miller, Jr.
*Attorney, Agent, or Firm*—Frank R. Trifari

[57] ABSTRACT

A recording head for a recording device utilizing electrosensitive paper, composed of a row of adjacently arranged electrode carriers, each of which consists of a flat body in which a chamber is recessed, the said chamber comprising a connection slot and a guide groove for a wire-shaped electrode. One principal surface of the body insulates and the other principal surface is at least partly conductive.

8 Claims, 3 Drawing Figures

RECORDING HEAD FOR A RECORDING DEVICE UTILIZING ELECTROSENSITIVE RECORDING PAPER

The invention relates to a recording head for a recording device utilizing electrosensitive recording paper, provided with a number of wire-shaped recording electrodes which are arranged in a row transverse to the movement direction of the recording paper and which comprise a bent portion between a freely movable extremity which serves as a recording pin and a connecting extremity which is connected in an electrode carrier which also serves an an insulating intermediate piece between the electrodes, the recording head being composed of a row of adjacently arranged electrode carriers.

A recording head of this kind is known from French Patent Specification 2,216,876.

The invention has for its object to provide a substantially simpler recording head which can thus be manufactured cheaper.

To this end, the recording head according to the invention is characterized in that each electrode carrier consists of a flat body in which is recessed which is provided with a connection slot for the connection extremity and a guide groove for the recording extremity of the electrode, a principal surface of the body being made of an insulating material, the other principal surface comprising a portion of a conductive material which extends without interruption at least between the connection slot and a connection tag formed on the body.

The invention will be described in detail hereinafter with reference to the drawing.

Figure 1A:
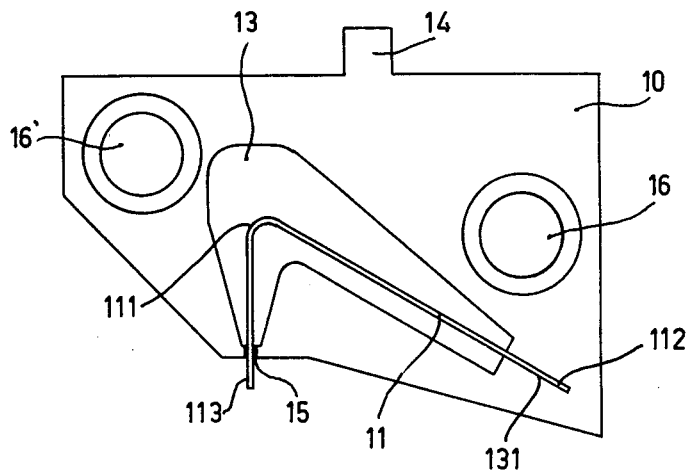
FIG. 1a is a side elevation of a first electrode carrier for a recording head according to the invention.
Figure 1B:
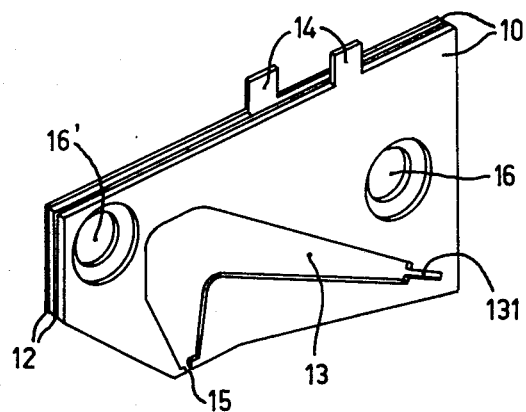
FIG. 1b is a perspective view of an assembly of two adjacently arranged electrode carriers of FIG. 1a, and FIG. 2 is a side elevation of a second electrode carrier for a recording head according to the invention.

The electrode carrier shown in the FIGS. 1a and 1b consists of a flat body 10, 12, a first portion 10 of which is made of a metal foil having a thickness which is slightly larger than the diameter of the wire-shaped electrode 11 (for example, a thickness of 200 microns versus an electrode diameter of 180 microns). The portion 10 can be formed by way of a chemical etching process or by way of any other method; the original metal foil is made, for example, of copper.

The portion 10 rests as a relief on an insulating layer 12 which constitutes the second portion of the body 10, 12 (see FIG. 1b) and which is formed, for example, by a foil of synthetic material which may possibly be attached to the portion 10. The portion 10 can alternatively be manufactured from a metal plate (having a thickness of 250 microns when the recording head comprises frou electrodes 11 per millimeter) which is chemically or mechanically treated to a depth which is slightly larger than the diameter of the electrode (so to a depth of 200 microns when the electrode diameter is 180 microns). The electrically insulating layer 12 between the electrode carriers is then obtained by forming a non-conductive oxide layer (for example, a layer of aluminium oxide if the metal used is aluminium) or by the application of an insulating lacquer.

The portion 10 comprises a chamber 13 provided with a connection slot 131 for the connection extremity 112 of the electrode 11 which can be connected therin by any arbitrary suitable means, for example, by soldering. The portion 10 furthermore comprises a projection 14 which serves as a connection tag. The electrical connection of the electrode 11 is thus effected via this connection tag rather than, like in the known recording heads, via the connection extremity 112 of the electrode. The bent portion 111 of the electrode 11 can then enclose an angle which is chosen to be such that the active portion 113 of the electrode moves substantially exclusively in its longitudinal direction, the central portion of the electrode then pivoting about the connection slot 131. This angle is less than 90° and may be, for example, between 45° and 70°. The bent portion 111 need not necessarily be locally kinked as shown in FIG. 1a; it may also be a bend which extends between the two extremities.

The free space formed by the chamber 13 is, of course, adapted to the shape of the electrode and terminates in a guide groove 15 which serves to guide the recording extremity 113 of the electrode.

As appears from FIG. 1b, the connection tags 14 of successive electrode carriers are arranged in a staggered manner, so that the spacing therebetween is increased and the connection of connection wires is facilitated.

The portion 10 can be manufactured, for example, as follows. If the metal used is copper, the basic material is the same as that used for the manufacture of flexible printed circuits. For a recording head comprising four electrodes having a thickness of, for example, 180$\mu$m, use can be made of a layer of synthetic material of 50$\mu$m thickness which is covered by a copper layer of a thickness of 200$\mu$m. The copper is chemically removed by etching in all parts where the electrode must be freely movable, i.e. in the entire chamber 13, except where the connection slot 131 and the guide groove 15 are to be situated. Also vacated are two regions at the area where mounting holes 16 and 16' have to be provided at a later stage. These mounting holes are necessary for assembling the electrode carriers so as to form a recording head. Subsequently, the connection slot 131 and the guide groove 15 are vacated, for example, by a microtreatment using a milling machine or by spark erosion (or possibly also in a chemical manner). Finally, the electrode 11 is inserted into the connection slot 131 and is electrically and mechanically connected, for example, by soldering. The electrode carrier is then ready for assembly.

Figure 2:
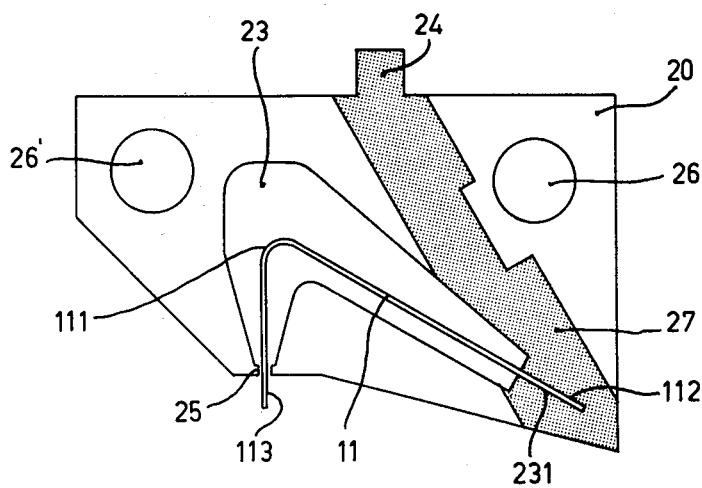

The electrode carrier shown in FIG. 2 is formed by a flat body 20 of insulating material which is manufactured, for example, by injection moulding or by thermoplastic deformation of a foil. The shape and the dimensions of the body 20 correspond approximately to the shape and the dimensions of the portion 10 of the body 10, 12 shown in the FIGS. 1a and 1b. The body 20 thus comprises a chamber 23 provided with a connection slot 231 and a guide groove 25, and also mounting holes 26 and 26' and a connection tag 24. Between the connection slot 231 and the connection tag 24 an electrical connection 27 is formed by metallization (vapour deposition, electroforming, or in another manner), so that like in the previous case electrode 11 can be electrically connected to the connection tag after having been inserted into the connection slot.

The dimensions already given can be extended by the following (all by way of example): the electrode portion between the bend 111 and the connection extremity 112 has a length of 10 to 20 mm, and the portion between the bend 111 and the recording extremity 113 has a length of 6 to 10 mm. These values, of course, are dependent on the one hand of the elasticity of the electrode material, and on the other hand of the desired recording pressure.

We claim:

1. A recording device including a recording head for cooperation with an associated electrosensitive recording paper, said head comprising a plurality of wire-shaped recording electrodes which are arranged in a row transverse to the direction of movement of the recording paper, each electrode comprising a bent portion intermediate a freely movable extremity which serves as a recording pin and a connection extremity, a plurality of electrode carriers arranged in a side abutting row which is generally parallel to the direction of movement of the record carrier, each electrode carrier cooperating with one of said electrodes, each of said electrode carriers including an insulating sheet intermediate the electrode with which the carrier is associated and one adjacent electrode, said recording head being composed of a row of adjacently arranged electrode carriers, each electrode carrier consisting of a flat body having a chamber therein which includes a connection slot for cooperation with the connection extremity and a guide groove for cooperation with the recording extremity of the electrode, each electrode carrier also comprising a principal surface having a portion of a conductive material which extends without interruption at least between the connection slot and a connection tag formed on the body.

2. A recording head as claimed in claim 1 wherein said conductive material is a strip formed by metallization of the surface of the plate.

3. A recording head as claimed in claim 1 wherein successive electrode carriers have said tags disposed at distances greater than the distance measure parallel to the row of recording pins.

4. A recording head as claimed in claim 1, wherein each of said principal surfaces is at least partly a metal foil and each of said principal surfaces and each of said insulating sheets have substantially equal side areas.

5. A recording head as claimed in claim 4 wherein said insulating sheets are formed of an oxide layer on said foil.

6. A recording head as claimed in claim 4 wherein said insulating sheet is formed by a foil of synthetic material and said head includes means for securing said material to said foil.

7. A recording head as claimed in claim 1 wherein said curved portion of the electrode encloses an angle which is smaller than 90°.

8. A recording head as claimed in claim 7 wherein said angle is between 45° and 70°.

* * * * *